Figure 1:
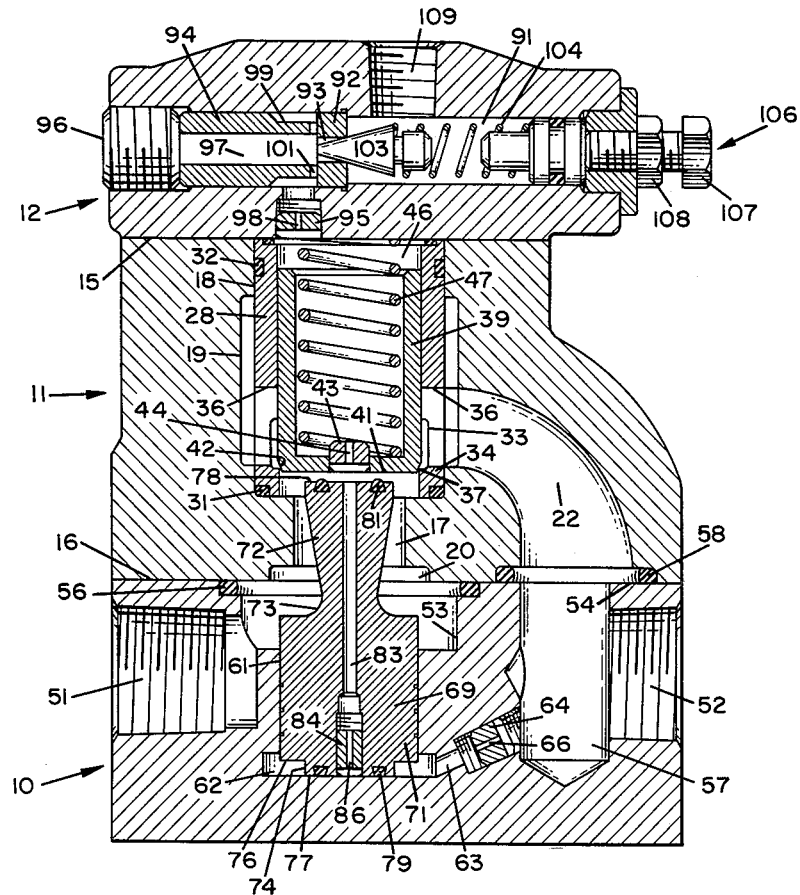

May 21, 1963   C. E. ADAMS   3,090,398
DUAL DIRECTION RELIEF OR SEQUENCE TYPE VALVE
Filed Feb. 5, 1962

INVENTOR.
CECIL E. ADAMS
BY
WOOD, HERRON & EVANS

United States Patent Office 3,090,398
Patented May 21, 1963

3,090,398
DUAL DIRECTION RELIEF OR SEQUENCE
TYPE VALVE
Cecil E. Adams, Columbus, Ohio, assignor to American Brake Shoe Company, New York, N.Y., a corporation of Delaware
Filed Feb. 5, 1962, Ser. No. 171,135
13 Claims. (Cl. 137—491)

This invention relates to dual or two directional relief and sequence type valves, that is, valves of the kind which will operate to open a flow path between two ports at a predetermined pressure adjustment or setting of the valve whereby fluid may flow from either port to the other depending upon which of its two ports is acting as the fluid inlet or high pressure port. For purposes of the following discussion and description, the invention is herein described in connection with a relief valve.

Conventional relief valves are usually unidirectional in that they permit flow in one direction only between two fluid passageways with which they are connected. The conventional relief valve has a definite, fixed inlet port and a definite, fixed outlet port and valve members between these ports which are operated or controlled by pressure at the inlet port in such manner that the relief valve opens to prevent the pressure at the inlet port from exceeding a predetermined value at which the valve has been set. The valve elements of the conventional relief valve are not responsive to or operated by pressure at the port which usually constitutes the outlet port, regardless of the pressure at that port.

In some kinds of hydraulic apparatus, for example a device wherein there are two fluid conduits, one of which carries high pressure and the other of which carries low pressure and wherein the order in which the conduits contain these pressures may be reversed, it is desirable to provide for the control of the flow of fluid from that conduit which is acting as the high pressure conduit to that conduit which is acting as the low pressure conduit thereby to control the maximum pressure in that conduit which is acting as the high pressure conduit.

A typical example of apparatus including the above described features and in which a relief valve including the features of this invention may be used with advantage is a closed loop hydraulic transmission in which fluid flows in opposite directions under different conditions. Specifically, where a reversible fluid pump is employed to drive a fluid motor in opposite directions it is often desirable to prevent the pressure in each of the fluid conduits connecting the pump and motor from exceeding some maximum limit above which the apparatus might be damaged. A dual direction relief valve including the features of this invention can be connected directly between the fluid conduits which interconnect the pump and motor, so that regardless of the direction in which fluid flows through the pump and regardless of which conduit is the high pressure conduit, the relief valve will prevent the pressure in that conduit from exceeding a predetermined value, for example 5,000 p.s.i. Such control could, of course, be effected by using a pair of relief valves oppositely connected between the mentioned conduits, but such an arrangement is relatively expensive and objectionably bulky. The dual direction relief valve which includes the features of the present invention may be connected between the mentioned conduits to perform the described function which has heretofore required two unidirectional relief valves.

Briefly, in the valve illustrated and described herein, opening of a pressure operated main valve spool is controlled by a pilot valve which opens at a predetermined pressure to limit the maximum valve-closing pressure of fluid in a fluid retaining or control pressure chamber or compartment on one side of the main valve spool. By means of a movable poppet or piston which forms a valve with a restricted opening or orifice through the main valve spool, the fluid retaining chamber communicates alternately with whichever port is under greater pressure. Pressure at one port is applied to the bottom of this poppet or piston and holds it against the spool, whereby fluid at that port is applied through a bore in the poppet directly into the fluid retaining chamber. Pressure at the other port moves the poppet or piston away from the spool and isolates the fluid retaining chamber from the first mentioned port and connects the fluid retaining chamber with the second port whereby the pressure at the second port is reflected to the fluid retaining or control pressure chamber to operate the pilot valve.

Figure 2:
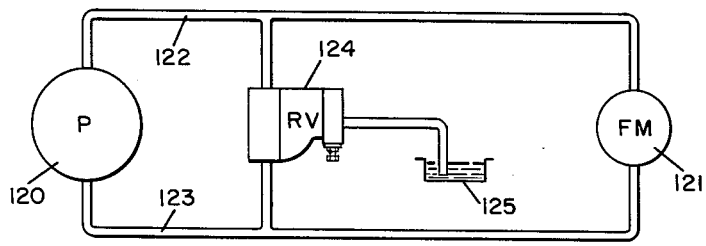

The invention can best be further described by reference to the accompanying drawings, in which:

FIGURE 1 is a vertical cross section of a dual direction relief valve which includes the invention in a preferred form, and FIGURE 2 is a schematic illustration of a typical hydraulic system in which the relief valve shown in FIGURE 1 may be used.

The relief valve which is herein employed to illustrate the invention in its presently preferred form is comprised of three main components or sections, namely, a lower body section 10, a middle body section 11, and a pilot or control valve cap section 12. The middle body section 11 is secured to the upper surface of the lower body section 10 by suitable means not shown, and the cap 12 is secured on the top surface of the middle body section 11.

Generally speaking, the lower body 10 includes the fluid ports or connections by which the relief valve is connected to fluid passageways or conduits, and also includes mechanism which is effective to apply pressure from whichever port is acting as the high pressure port to operate the main valve. The middle body section 11 contains the main valve forming elements and includes fluid passageways which communicate through the main valve between the ports of the lower body. The cap structure 12 includes a pilot valve for directly controlling the opening and closing of the main valve elements of the middle body 11.

The middle body 11 has a flat upper surface 15 and a flat lower surface 16 which is parallel to the surface 15. A stepped central vertical bore 17 is formed in middle body 11 between the surfaces 15 and 16 thereof. The upper portion of bore 17 is enlarged, as at 18, and is provided with an annular groove 19. The lower end of bore 17 is enlarged, as at 20, adjacent lower surface 16. A downwardly curving fluid passageway 22 communicates between groove 19 of bore 17 and the lower surface 16 of the middle body 11.

A cylindrical sleeve 28 is snugly fitted in portion 18 of bore 17, closing groove 19, and its lower end is seated against an annular shoulder which demarcates portion 18 in bore 17. Suitable fluid seals 31 and 32 such as the O-rings shown are provided at the lower and upper ends respectively of sleeve 28 whereby the sleeve is sealed to bore 18. An annular groove 33 is formed around the interior surface of sleeeve 28 adjacent the lower end 34 thereof, and a plurality of ports 36 provide fluid communication through the sleeve 28 between groove 33 of the sleeve and groove 19 formed in bore portion 18. An annular, right angled or sharp internal edge 37 is defined between groove 33 and the lower end 34 of the sleeve 28, and this edge 37 comprises one of the surfaces which coact to form the main valve, as will be explained.

A cylindrical, hollow, cup-shaped poppet or movable valve spool 39 is slidably received in sleeve 28. At its lower end 41 the spool 39 is provided with a conical external surface 42 which cooperates with edge 37 of sleeve 28 to form the main valve for controlling pressure. A plug 43 is threaded into an opening in the lower end 41 of spool 39, and this plug 43 has restricted opening or orifice 44 through it. Opening 44 provides restricted fluid communication through the lower end surface 41 of spool 37 between bore 17 and the fluid retaining or control pressure chamber 46 which is defined on the interior of and above spool 39.

A compression spring 47 in chamber 46 bears against the lower end 41 of spool 39 and tends to hold the spool downwardly in sleeve 28. In the relief valve shown the cross-sectional area of spool 39 is preferably slightly greater, e.g. about 3%, than the internal area within the lower end 34 of sleeve 28, but when the valve is to function as a sequence valve then the conical surface 42 will be omitted and the cross-sectional area of the lower end of the spool 39 will be made to equal the cross-sectional area of the bore in the sleeve 28 and the sharp edged seat or edge 37 therein will be tapered, i.e., the shapes of the end of the spool 39 and the valve seat 37 will be reversed.

As previously mentioned, the lower body section 10 contains the fluid ports by which connection is made into the hydraulic system in which the relief valve is used. In the embodiment shown, the lower body is adapted for connection to externally threaded fluid piping, although it will of course be appreciated that other types of connections can be used, including flange and subplate mounting.

The lower body 10 has a port 51 formed on one side thereof and a port 52 formed on the opposite side thereof. Each of these ports 51 and 52 is provided with suitable threading for connection to fluid piping as mentioned. The port 51 communicates with a shallow central vertical bore 53 which is formed adjacent the upper surface 54 of the lower body 10. Bore 53 is centered axially with respect to bore 17 in the middle body section 11, and the bores 17 and 53 are in fluid communication. An O-ring 56 is provided around the two bores 17 and 53 to provide a fluid seal between the adjacent surfaces 16 and 54.

Port 52 of lower body 10 intersects a vertical bore 57 which communicates with the downwardly curving passageway 22 in the middle body 11. An O-ring 58 is provided around the lower end of passageway 22 between surfaces 16 and 54. A bore 61 which is of smaller diameter than bore 53 extends downwardly from bore 53, and this bore 61 is coaxial with the spool 39. Bore 61 is enlarged at its lower end, as at 62. A diagonally extending bore 63 extends between vertical bore 57 and the lower portion 62 of bore 61, and a plug 64 having a restricted opening or orifice 66 through it is secured in bore 63. Restricted opening 66 in plug 64 provides restricted fluid communication between bore 57 and bore 61.

A movable piston or poppet member generally designated by 69 is slidably received in bore 61. This piston or poppet member 69 has a cylindrical lower portion 71 which forms a movable fluid seal with bore 61 in which it slides. The poppet 69 also has a tapered or inverted conical upper portion 72 which rounds outwardly as at 73 where the portion 72 joins with the lower portion 71 of poppet 69. The faired surface 73 reduces turbulence in either direction of flow between ports 51 and 52. The cross-sectional area of poppet 69 is preferably slightly less, e.g. by about 3%, than the internal area at the lower end 34 of sleeve 28, and is thus preferably about 6% smaller than the area of spool 39. When the valve is to function as a sequence valve the cross-sectional area of poppet 69 will be made equal to the cross-sectional area of the spool 39. A small diameter neck portion 74 is formed at the lower end of poppet 69, and a horizontal annular area 76 is defined between neck 74 and portion 71 of poppet 69. Both the lower end 77 and the upper end 78 of poppet 69 are flat and are fitted with identical O-rings 79 and 81 respectively. When the poppet 69 is forced downwardly in bore 61, the O-ring 79 in the lower end 77 of the poppet forms a valve or fluid seal with the bottom surface of bore 62, and when the poppet 69 is forced upwardly in bore 61, the O-ring 81 in the upper end 78 of the poppet 69 forms a valve or fluid seal with the lower end 41 of the spool 39.

An axial bore 83 extends through poppet 69 between the ends 77 and 78 thereof, and is provided with a plug 84 which has a restricted opening or orifice 86 formed in it. The O-rings 79 and 81 encircle the ends of bore 83. As will be explained, fluid pressure at port 52 is supplied to the lower end of poppet 69 and urges the poppet upwardly into facial engagement with the lower end 41 of spool 39, so that a fluid passageway is provided from the lower end of poppet 69 and port 52 into the control pressure chamber 46 above spool 39 through the passageways 83 and 44 which, under these circumstances, are sealingly connected end to end by the valve action of O-ring 81 and the bottom of spool 39.

The cap structure 12 which is mounted atop the upper surface 15 of middle body 11 contains a suitable pilot or control valve mechanism which directly controls the opening of the main valve 37, 42, and whereby the pressure at which the main valve opens can be adjusted. As herein, shown, the cap 12 has a horizontal bore 91 formed through it, and a fixed pilot valve seat element 92 is seated against a shoulder in the bore 91. Pilot valve seat element 92 has an axial bore 93. A sleeve 94 in bore 91 bears against the fixed valve element 92 and holds it against the shoulder in bore 91, and this sleeve 94 is in turn held in place by a plug 96 which closes the left end of bore 91. The internal chamber 97 within sleeve 94 thus communicates with the bore 93 in valve seat element 92.

Fluid communication between the control pressure chamber 46 within spool 39 and the chamber 97 in sleeve 94 of the pilot valve is established through a plug 95 having an opening or orifice 98 through it, an external groove or neck 99 around the sleeve 94, and ports 101 formed through sleeve 94. A cone-shaped movable valve element 103 cooperates with the seat 92 to form a pilot valve which controls the maximum pressure in control pressure chamber 46. A compression spring 104 urges the movable element 103 into closing position with respect to the fixed valve element 92. The compression of spring 104 is adjusted by means of an adjusting mechanism which is designated generally by 106. The adjusting mechanism 106 includes an adjusting screw 107 the inner end of which bears against a plug slidable in the bore 91 which carries an O-ring seal and which abuts the spring 104 and thereby determines the compression of that spring. A lock nut 108 secures screw 107 axially with respect to bore 91 in the cap structure 12. A tank port 109 communicates with the chamber 110 on the right or downstream side of valve element 103 and is connectable to a fluid tank or reservoir.

FIGURE 2 of the drawings illustrates a typical hydraulic circuit in which a relief valve including this invention may be used with advantage. In FIGURE 2, a hydraulic transmission is shown in which a reversible fluid pump 120 drives a fluid motor 121. The pump 120 and motor 121 are connected by fluid conduits or passageways 122 and 123. The pump 120, being of the cross-center reversible type, may be controlled to supply fluid under pressure to either conduit 122 or 123 so as to rotate the fluid motor in either of two opposite directions. A dual direction relief valve 124 in accordance with the invention is connected between line 122 and line 123 to prevent the pressure in that conduit 122 or 123 which is acting as the high pressure conduit from exceeding some predetermined value which is controlled by the setting of the pilot valve of the valve 124. The drain port 109 of the relief valve 124 (see FIGURE 1) is connected to a fluid reservoir or tank 125. It is assumed that the port 51 of the valve illustrated in FIGURE 1 is connected to conduit 122 and that the port 52 is connected to the conduit 123, although these connections could be reversed by reason of the two directional operation characteristics of the present relief valve.

When the pressure in conduit 122 exceeds the pressure at which the relief valve 124 is set to operate, the relief valve opens and directs excess fluid in conduit 122 directly to conduit 123, by-passing the fluid motor 121 and maintaining the pressure in conduit 122 at that value to which the relief valve has been set. Similarly, when the pump 120 is supplying pressure to conduit 123 and that pressure exceeds the value at which the relief valve has been set to open, the relief valve spills excess fluid directly to conduit 122, by passing the motor 121 and maintaining the pressure in conduit 123 from exceeding the preestablished value.

With reference to FIGURE 1, and assuming first that pressure is supplied to port 51 and that port 52 is at low pressure with respect to port 51, so that port 51 under these circumstances comprises the inlet port, fluid pressure at port 51 is applied to the lower end surface or area 41 of spool 39 through bores 53 and 17. Under static conditions (when the valve 37, 42 is closed), this same fluid pressure is reflected in chamber 46 above spool 39 through the restricted opening or orifice 44 in the lower end of spool 39. The pressure of fluid beneath spool 39 and at port 51 acts upwardly on an area equal to the cross-sectional internal area within the lower end 34 of the sleeve 28, whereas the pressure above the spool 39 in chamber 46 acts downwardly on a slightly larger area which is equal to the cross-sectional area of spool 39. As previously explained, the cross-sectional area of the spool 39 is slightly greater, preferably about 3%, than the area of the lower end 34 of the sleeve 28. Therefore, under these circumstances, the downward acting fluid force is the greater, and together with the force of spring 47, holds the main valve 37, 42 closed.

The fluid pressure in control pressure chamber 46 is applied to the left end of movable pilot valve element 103 through restricted opening or orifice 98, groove 99, ports 101, chamber 97, and bore 93 in the fixed valve element 92. Spring 104 holds the valve 92, 103 closed until the fluid force tending to open the pilot valve exceeds the force of spring 104.

When the fluid pressure at the inlet 51, as reflected on conical pilot valve element 103, applies a force to the valve element 103 which is greater than the force of spring 104, the pilot valve 92, 103 opens, permitting fluid under pressure in chamber 97 to flow to the tank port 109 thus maintaining the pressure in chamber 46 at that pressure at which valve 92, 103 opens.

If the spring 104 is adjusted to require 3000 p.s.i. acting on poppet 103 the open valve 92, 103, then the pressure in control presure chamber 46 will never more than slightly exceed 3000 p.s.i. and this excess will be due solely to the pressure drop across the non-chatter orifice 98. Thus, whenever valve 92, 193 is open there will be a flow of fluid from the port 51 through the orifice 44, chamber 46, orifice 98 and valve 92, 103 to port 109. It will thus be seen that the resulting pressure drop across the orifice 44 will create a pressure differential at opposite ends of the spool 39 with the greater pressure tending to lift the spool 39 thereby opening the valve 37, 42 in proportion to the pressure differential and limiting the pressure in port 51 to a value only slightly higher than that pressure at which valve 92, 103 opens.

As the main valve 37, 42 opens, fluid under pressure at the lower end of spool 39 is released to port 42, which under these circumstances is an outlet port, through groove 33, ports 36, curved passageway 22, and bore 58. The compression of spring 104, which determines the fluid pressure required to open the pilot valve 92, 103, controls the pressure in inlet 51 at which the main valve 37, 42 will open, and as previously explained this operating pressure can be adjusted by means of the adjusting mechanism 106.

When the pressure of fluid at the inlet 51 drops to a value at which the fluid force acting on movable valve element 103 is less than the force of spring 104, the pilot valve 92, 103 will close, thereby preventing flow to tank through port 109, and the fluid pressure in chamber 46 rapidly builds up to a pressure equal to that acting on the lower end of spool 39. The valve closing fluid pressure, together with the mechanical force of the spring 47, then closes the main valve 37, 42.

When the pressure at port 51 is greater than that at port 52, the poppet 69 is held downwardly in bore 61 by the pressure of fluid acting on its upwardly facing surfaces. Under these conditions, where port 52 is the outlet port, the pressure on annular area 76 will be equal to the pressure of fluid at the outlet. Therefore, the large downwardly acting pressure holds the poppet 69 against the lower end of bore 62, and fluid is prevented from flowing through bore 83 by the valve means including O-ring 79 which forms a seal at the lower end of the poppet 69.

When the pressure at port 52 is greater than that at post 51, port 52 comprises the inlet port of the valve. Pressure at port 52 is applied laterally against spool 39 through passage 22, and thus acts directly on only 3% of the total cross-sectional area of the spool 39, namely that portion of the conical surface 42 which is above the seat 37. This same pressure is applied through orifice 66 in bore 63 to the annular area surrounding the O-ring 79 and including the area 76 around the neck 74 at the lower end of poppet 69. Since the pressure at port 51 is relatively low by assumption the pressure on the described annular area lifts the poppet 69 in bore 61 and holds its upper end 78 in facial sealing engagement with lower end 41 of spool 39. The O-ring 81 forms a fluid seal between the upper surface 78 of poppet 69 and the lower end 41 of the spool 39, so that a direct fluid passageway is provided between bore 62 to chamber 46 through bore 83 and restricted opening or orifice 44. Through these connecting passageways pressure in inlet 52 is applied to chamber 46 and pilot valve element 103, and it is this pressure in conjunction with the pressure at port 52 acting on the bottom end of piston 69 which then controls the operation of the pilot valve.

The pressure of fluid in chamber 46 acts downwardly on the cross-sectional area of the spool 39, whereas the pressure of fluid acting upwardly on the lower end of the poppet 69 acts on a cross-sectional area which is preferably about 6% smaller, as previously explained, than the cross-sectional area of spool 39, but this area when added to the 3% at the edge 42 leaves a total 3% difference in effective hydraulic unbalance on the spool 39, and therefore a net downward force holds the spool 39 downwardly to maintain the valve 37, 42 closed until the pressure in chamber 46 is released. (Thus, regardless of whether port 51 or port 52 is the inlet port, hydraulic and spring pressure holds the main valve 37, 42 closed until the pilot valve 92, 103 opens and the force of spring 47 is overcome). The pressure at inlet 52 will be maintained at the value determined by the compression of spring 104, and this pressure will continue to hold the poppet 69 against the spool 39. When the pressure at the inlet 52 drops below the value maintained by spring 104, the pilot valve 92, 103 closes, the pressure in chamber 46 builds up to a value equal to the pressure at port 52 and supplies a force which with the spring 47 then overcomes the upward force applied to the poppet 69, and closes the valve 37, 42. Fluid pressure at the lower end of poppet 69 will hold the poppet in contact with the lower end 41 of the spool 39 so long as this pressure is greater than the pressure in port 51, which tends to move and hold the poppet 69 downwardly.

From the foregoing it will be seen that regardless of the direction of fluid flow through the relief valve, it is the pilot valve 92, 103 which controls the operation of the valve 37, 42. In the first circumstance described, however, the pressure applied to the pilot valve is controlled by pressure at inlet 51, whereas in the other situation the pressure at port 52 is applied to the pilot valve to operate it. In effect, the piston or poppet 69, which when the port 52 is the high pressure port is operative in actuating the spool 39, also comprises a valve which connects the appropriate port 51 or 52, whichever is under the greater pressure, to supply the operating pressure to the pilot valve, and the pilot valve is thus operated by whichever pressure at the ports 51, 52 is the greater.

It may be mentioned here that in the embodiment of the relief valve herein chosen to illustrate the invention in a preferred form, the diameter of the spool 39 is 1.125 inches, orifice 44 is .0280 inch in diameter, orifices 66 and 86 are .0310 inch in diameter, orifice 98 is .0400 inch in diameter and spring 47 exerts approximately fifty pounds of downward or valve closing force on spool 39. It will be understood that if the diameter of the spool 39 is varied materially from the 1.125 dimension it may be desirable to vary the other mentioned parameters.

Structure generally similar to the structure of the middle body portion 11 and cap pilot valve structure 12 is disclosed in Joseph H. Caslow et al. application Serial No. 102,824, filed April 13, 1961, entitled "High Speed Valves," to which reference is hereby made. It will be seen that the structure disclosed in FIGURE 1 of the Caslow et al. application can readily be modified to operatively correspond to the structure of the middle body portion 11 and cap 12 of the present dual direction relief valve. It is pointed out, however, that the relief valve shown in FIGURE 1 of the Caslow et al. application is a unidirectional relief valve, whereas the present valve is a dual direction relief valve.

In the structure disclosed in FIGURE 1 of the drawings herein, the pressure at which the relief valve operates is determined by the compression on spring 104 which is manually adjusted by means of the adjusting mechanism 106. The valve thus has a single pressure setting for flow in either direction. It is contemplated that electrically operated pilot valve structure may be substituted for the manually operated pilot valve structure disclosed in the apparatus shown in FIGURE 1. That is, in place of the spring 104 used to control the pressure at which the pilot valve opens, electrically operated means including an electromechanical transducer which supplies a mechanical force for controlling the operation of the pilot valve may be substituted for the pilot valve of FIGURE 1. One embodiment of an electromechanically operated pilot valve which is suitable for this purpose is disclosed in Cecil E. Adams et al. application Serial No. 46,981, filed August 2, 1960, entitled "Electric and Fluid Pressure Operated Valve Mechanism and Control Circuit Therefor," to which reference is hereby made. In the valve of the Adams et al. application, the force for maintaining a pilot valve closed is delivered by an electromagnetically operated poppet member, which delivers a constant mechanical force in response to any given magnitude of electrical current supplied to the transducer. It will be seen, with reference to the Adams et al. application, that the pilot valve structure which is designated 12 in that application can be modified for use with the main body portion 11 of the present application by providing suitable fluid conduits between chamber 46 of the structure in FIGURE 1 of the present application and the restricted opening which is designated as 38 in the Adams application. Use of a remotely adjusted pressure control valve will permit a different pressure control setting for flow in each direction, if desired.

While I have described the preferred embodiment of my invention herein, it will be realized that the invention is not limited to that embodiment alone but also includes other modifications and variations falling within the spirit and meaning of the claims which follow.

I claim:

1. In a valve of the type described which includes means forming a valve between a first port and a second port, said valve means including a movable element the position of which controls the flow of fluid between said ports, means forming a control pressure chamber the pressure in which acts to urge said movable element in one direction, means presenting a surface subjected to fluid pressure at said first port for urging said movable element in the opposite direction, orifice means through which fluid must flow to enter said control chamber, and pilot valve means for controlling the maximum pressure in said control chamber, that improvement which makes the valve responsive to the higher of the pressures in said first and second ports which comprises a movable differential pressure operated piston means having opposite surfaces disposed to be acted upon respectively by the fluid pressures at said first port and at said second port and arranged to cooperate with said surface presenting means for urging said movable element in said opposite direction when the pressure at said second port is greater than the pressure at said first port, and valve means operated by said movable piston means for connecting said orifice means with whichever of said ports contains the higher pressure while isolating said orifice means from that port which contains the lower pressure.

2. In a valve of the type described which includes means forming a valve between a first port and a second port, said valve means including a movable element the position of which controls the flow of fluid between said ports, means forming a control pressure chamber the pressure in which acts to urge said movable element in one direction, said movable element having a surface subjected to fluid pressure at said first port for urging said movable element in the opposite direction, orifice means through which fluid must flow to enter said control chamber, and pilot valve means for controlling the maximum pressure in said control chamber, that improvement which makes the valve responsive to the higher of the pressures in said first and second ports which improvement comprises a movable differential pressure operated piston means having opposite surfaces disposed to be acted upon respectively by the fluid pressures at said first port and at said second port, said movable piston means being arranged to cooperate with said surface of said movable element for abutting said movable valve element and moving said movable element in said opposite direction in response to pressure at said second port when the pressure at said second port is greater than the pressure at said first port, and valve means operated by said movable piston means for connecting said orifice means with whichever of said ports contains the higher pressure and simultaneously isolating said orifice means from that port which contains the lower pressure.

3. In a valve of the type described which includes means forming a valve between a first port and a second port, said valve means including an axially movable element the axial position of which controls the flow of fluid between said ports, means forming a control pressure chamber the pressure in which acts to urge said movable element in one axial direction, said movable element having a surface adapted to be subjected to fluid pressure at said first port for urging said movable element in the opposite axial direction, orifice means extending axially through said movable element through which fluid must flow to enter said control pressure chamber, and pilot valve means for controlling the maximum pressure in said control chamber, that improvement which makes the valve responsive to the higher of the pressures in said first and second ports which comprises a movable differential pressure operated piston means, said piston means being movable axially with respect to said movable element and having opposite surfaces disposed to be acted upon respectively by the fluid pressures at said first and second ports, one of said opposite surfaces of said piston means being arranged to cooperate with said surface of said movable element for urging said movable valve element in said opposite direction in response to pressure at said second port when the pressure at said second port is greater than the pressure at said first port, and valve means operated by said movable piston means for connecting said orifice means with whichever of said ports contains the higher pressure while isolating said orifice means from that port which contains the lower pressure.

4. In a valve of the type described which includes means forming a valve between a first port and a second port, said valve means including a movable element the position of which controls the flow of fluid between said ports, means forming a control pressure chamber the pressure in which acts to urge said movable element in one direction, said movable element having an end surface subjected to fluid pressure at said first port for urging said movable element in the opposite direction, orifice means in said movable element communicating between said end surface and said control chamber through which fluid must flow to enter said control chamber, and pressure limiting pilot valve means for controlling the maximum pressure in said control chamber, that improvement which makes the valve responsive to the higher of the pressures in said first and second ports which includes a movable differential pressure operated piston means having opposite end surfaces disposed to be acted upon respectively by the fluid pressures at said first and second ports, said piston means being moved into abutment with said end surface of said movable element by pressure at said second port and away from said movable element by pressure at said first port, said piston means being arranged to cooperate with said end surface of said movable element for moving said movable element in said opposite direction in response to pressure at said second port, a flow restricting passageway between the end surfaces of said piston means, said passageway connecting end to end with the orifice means in said movable element when said piston means is acted upon by pressure at said second port, and pressure operated valve means including an O-ring around each end of said passageway for closing the passageway in said piston means to the flow of fluid therethrough in response to pressure at said first port and for isolating said orifice means from said first port in response to pressure at said second port.

5. A two directional valve comprising, a valve body, said body presenting a chamber therewithin, a first port entering said chamber at one end thereof, means presenting a valve seat between said first port and said chamber, a second port extending from the side of said chamber adjacent said first port, a movable valve element in said chamber, said valve element having an end portion the edge of which forms a valve with said valve seat, a spring biasing said valve element toward said valve seat, pressure limiting pilot valve means operated by pressure at the end of said valve element which is opposite to said end portion to prevent pressure in said chamber from exceeding a predetermined value, a flow restricting passageway extending between the ends of said valve element, and movable means responsive to pressure in said second port to be moved by pressure in said second port into engagement with said portion of said valve element, said movable means including a passageway connecting with the passageway in said valve element when said movable means engages said end portion to supply pressure from said second port thereto, pressure at said first port holding said movable means away from said valve element, and valve means closing the passageway in said movable member to the flow of fluid therethrough in response to pressure at said first port.

6. A two directional valve comprising, a valve body, said body presenting a chamber therewithin, a first port axially entering said chamber at one end thereof, means presenting a valve seat between said first port and said chamber, a second port extending from the side of said chamber adjacent said first port, a movable valve spool slidably received in said chamber, said spool having at one end thereof an edge portion forming a valve with said seat, a spring biasing said spool toward said valve seat, pressure limiting pilot valve means operated by pressure at the end of said spool which is opposite from said one end to prevent said pressure from exceeding a predetermined value, a flow restricting passageway extending between the ends of said spool, and movable means moved by pressure at said second port into engagement with said one end of said spool, said movable means including a passage connecting end to end with the passageway in said spool when said movable means engages said one end of said spool to supply pressure from said second port to said passageway, pressure at said first port holding said movable means away from said spool, and pressure operated valve means including an O-ring closing the passage in said movable member to the flow of fluid therethrough in response to pressure at said first port.

7. A two directional valve comprising, a valve body, said body presenting a cylindrical chamber, a first port entering said chamber axially at one end thereof, means presenting a fixed annular valve shoulder between said first port and said chamber, a second port extending from the side of said chamber, a movable valve spool slidably received in said chamber, said spool having an endwise portion the edge of which forms a valve with said valve shoulder, a spring biasing said spool to closed position with respect to said valve shoulder, pressure limiting pilot valve means operated by pressure at the end of said spool which is opposite to said endwise portion to prevent said pressure from exceeding a predetermined value, a flow restricting passage extending between the ends of said spool, a poppet movable in a bore axially aligned with said chamber adjacent the endwise portion of said spool, said poppet having an extension extending into said first port which is engageable in abutting relation with the endwise portion of said spool when said poppet is moved toward said spool in said bore, said poppet having a bore formed longitudinally therethrough which communicates with the flow restricting passage in said spool when the extension of said poppet abuts the endwise portion of said spool, valve means closing the bore in said poppet to the flow of fluid therethrough in response to pressure in said first port, and a passage communicating between said second port and the end of said poppet opposite from said extension.

8. A two directional valve comprising, a valve body, said body presenting a cylindrical chamber, a first port entering said chamber axially at one end thereof, means presenting a fixed annular valve shoulder between said first port and said chamber, a second port extending from the side of said chamber, a movable valve spool slidably received in said chamber, said spool having a flat endwise portion the edge of which forms a valve with said valve shoulder, a spring biasing said spool to closed position with respect to said valve shoulder, pressure limiting pilot valve means operated by pressure at the end of said spool which is opposite to said endwise portion to release pressure in said chamber in excess of a predetermined value, a flow restricting passage extending between the ends of said spool, a poppet movable axially in a bore axially aligned with said chamber and adjacent the endwise portion of said spool, said poppet having an extension extending into said first port, said poppet being movable in said bore between one position in which said extension abuts the endwise portion of said spool and a second position axially remote from said spool in which said poppet abuts the end of said bore, said poppet having a passageway formed longitudinally therethrough which communicates with the flow restricting passage in said spool when the extension of said poppet abuts the endwise portion of said spool, a flow restrictor in said passageway, and a passage including a restrictor communicating between said second port and the end of said poppet opposite from said extension.

9. A two directional valve comprising, a valve body, said body presenting a cylindrical chamber therewithin, a first port entering said chamber at one end thereof, a second port extending from the side of said chamber at a point spaced from said first port, a fixed valve seat between said ports, a movable valve spool slidably received in said chamber for controlling pressure between said ports, said spool having an endwise portion forming a valve with said valve seat, a spring biasing said spool toward said seat, pressure limiting pilot valve means responsive to pressure acting on said spool at the end thereof opposite to said endwise portion to release pressure in excess of a predetermined value, a flow restricting opening extending between the ends of said spool, a piston movable in a bore, said bore being aligned axially with said spool adjacent said endwise portion thereof, said piston being movable in said bore into abutting engagement with said endwise portion of said spool, said piston having a passageway which communicates with the flow restricting opening in said spool when said piston is abutting said spool, a passage communicating between said second port and the end of said poppet remote from said spool, means closing the passageway in said piston to the flow of fluid therethrough when the pressure at said first port is greater than the pressure at said second port, and passage means applying the pressure at said second port to the passageway in said piston when the pressure at said second port is greater than the pressure at said first port.

10. A two directional valve comprising, a valve body, said body presenting a cylindrical chamber, a first port entering said chamber axially at one end thereof, means presenting a fixed annular valve shoulder between said first port and said chamber, a second port extending from the side of said chamber, a movable valve spool slidably received in said chamber, said spool having a flat endwise portion the edge of which forms a valve with said valve shoulder, a spring biasing said spool to closed position with respect to said valve shoulder, pressure limiting pilot valve means operated by pressure at the end of said spool which is opposite to said endwise portion to release pressure in said chamber in excess of a predetermined value, a flow restricting passage extending between the ends of said spool, a poppet movable axially in a bore axially aligned with said chamber and adjacent the endwise portion of said spool, said poppet having an extension extending into said first port, said poppet being movable in said bore between one position in which said extension abuts the endwise portion of said spool and a second position axially remote from said spool in which said poppet abuts the end of said bore, said poppet having a passageway formed longitudinally therethrough which communicates with the flow restricting passage in said spool when the extension of said poppet abuts the flat endwise portion of said spool, a flow restrictor in said passageway, a passage including a restrictor communicating between said second port and the end of said poppet opposite from said extension, and sealing means surrounding each end of said passageway in said poppet forming a valve with said flat endwise portion and with the bottom of said bore respectively for preventing the escape of fluid in said passageway.

11. A two directional valve comprising, a valve body, said body presenting a cylindrical chamber therewithin, a sleeve sealingly fitted in said chamber, a first port entering said chamber at one end thereof, said sleeve presenting an internal right angled annular valve seat adjacent said first port, a second port extending laterally from the side of said chamber adjacent said first port, passages communicating through said sleeve to said second port, a cup-shaped valve spool slidably received in said sleeve, said spool having an angulated surface around its bottom which forms a valve with said annular valve seat, a spring biasing said spool toward said valve seat, pressure above said spool urging said spool toward said seat, pressure at said first port tending to open said valve and flow to said second port, pressure limiting pilot valve means operated by pressure above said spool to prevent pressure above said spool from exceeding a predetermined value, a flow restricting passage extending through the bottom of said spool, a piston movable in response to pressure applied to one end thereof into facial engagement with the bottom of said spool, said piston having a longitudinal passage connecting with the passage in said spool when said piston is facially engaged against the bottom of said spool, a passage including a flow restricting orifice communicating between said one end of said piston and said second port, pressure at said first port holding said piston away from said spool, pressure at said second port moving said piston into engagement with said spool, and valve means closing the passage in said piston to the flow of fluid therethrough in response to pressure at said first port.

12. A two directional valve comprising, a valve body, said body presenting a cylindrical chamber therewithin, a sleeve sealingly fitted in said chamber, a first port entering said chamber at one end thereof, said sleeve presenting an internal right angled annular valve seat adjacent said first port, a second port extending laterally from the side of said chamber adjacent said first port, passages communicating through said sleeve to said second port, a cup-shaped valve spool slidably received in said sleeve, said spool having an annular edge around its bottom which forms a valve with said annular valve seat, the cross-sectional area of said spool being about 3% greater than the internal area bounded by said valve seat, a spring biasing said spool toward said valve seat, pressure above said spool urging said spool toward said seat, pressure at said first port tending to open said valve and flow to said second port, pressure limiting pilot valve means operated by pressure above said spool to prevent pressure above said spool from exceeding a predetermined value, a flow restricting passage extending through the bottom of said spool, a piston having one end adjacent said spool and one end remote from said spool, said piston moving toward said spool in response to pressure at said second port, said piston having at the end which is adjacent said spool means which sealingly engage the bottom of said spool when said piston is moved toward said spool by pressure at said second port, the cross-sectional area of said piston being less than the cross-sectional area of said spool, said piston having a longitudinal passage therethrough which sealingly connects with the passage in said spool when said piston is facially engaged against the bottom of said spool, a passage including a flow restricting orifice communicating between the end of said piston which is remote from said spool and said second port to apply pressure at said second port to the end of said piston which is remote from said spool and thereby move said piston toward said spool, pressure at said first port acting on the end of said piston which is adjacent said spool to move said piston away from said spool, and valve means closing the passage in said piston to the flow of fluid therethrough in response to pressure at said first port.

13. A two directional valve comprising, a valve body, said body presenting a cylindrical chamber therewithin, a sleeve sealingly fitted in said chamber, a first port entering said chamber at one end thereof, said sleeve presenting an internal right angled annular valve seat adjacent said first port, a second port extending laterally from the side of said chamber adjacent said first port, passages communicating through said sleeve to said second port, a cup-shaped valve spool slidably received in said sleeve, said spool having a conical peripheral edge around its bottom which edge forms a valve with said annular valve seat, the cross-sectional area of said spool being about 3% greater than the internal area bounded by said valve seat, a spring biasing said spool toward said valve seat, pressure above said spool urging said spool toward said seat, pressure at said first port tending to open said valve and flow to said second port, pressure limiting pilot valve means operated by pressure above said spool to prevent pressure above said spool from exceeding a predetermined value, a flow restricting passage extending through the bottom of said spool, a piston moving toward said spool in response to pressure at said second port, said piston having a face which facially engages the bottom of said spool when said piston is moved toward said spool by pressure at said second port, the cross-sectional area of said piston being about 3% less than the internal area bounded by said valve seat, said piston having a passage connecting at one end with the passage in said spool when said piston is facially engaged against the bottom of said spool, a passage including a flow restricting orifice communicating between the other end of the passage in said piston and said second port, and valve means closing the passage in said piston to the flow of fluid therethrough in response to pressure at said first port.

References Cited in the file of this patent

UNITED STATES PATENTS

| | | |
|---|---|---|
| 2,661,763 | Renick | Dec. 8, 1953 |
| 2,835,266 | Morte | May 20, 1958 |
| 2,930,398 | Barrett et al. | Mar. 29, 1960 |
| 2,989,073 | Banker | June 20, 1961 |